June 28, 1966 R. SCHMIDT 3,258,048
ASSEMBLED THREADED FASTENER AND LOCK WASHER UNITS
Filed April 7, 1964 2 Sheets-Sheet 1

INVENTOR
RUDOLPH SCHMIDT
BY *Arthur Jacob*
HIS ATTORNEY

June 28, 1966  R. SCHMIDT  3,258,048
ASSEMBLED THREADED FASTENER AND LOCK WASHER UNITS
Filed April 7, 1964  2 Sheets-Sheet 2

INVENTOR
RUDOLPH SCHMIDT
BY Arthur Jacob
HIS ATTORNEY

United States Patent Office 3,258,048
Patented June 28, 1966

3,258,048
ASSEMBLED THREADED FASTENER AND LOCK WASHER UNITS
Rudolph Schmidt, Mary Allen Lane, Mountainside, N.J.
Filed Apr. 7, 1964, Ser. No. 357,965
5 Claims. (Cl. 151—37)

The present invention relates generally to assembled fastener units and methods of making such units. More specifically, the invention pertains to threaded fasteners, such as nuts, having a toothed lock washer permanently fixed to the body of the fastener and to a method of permanently securing such lock washers to such fasteners.

Because of the proven effectiveness of toothed lock washers when used in combination with threaded fastener elements, assembled fastener units, each made up of a threaded fastener with a lock washer permanently fixed thereto, have been developed and have enjoyed wide commercial acceptance. While a variety of configurations for such assemblies have been suggested and a number of methods for joining the individual component parts into such an assembly have been evolved in an effort to effect efficient operation of each unit as a whole, and the lock washer in particular, it would be advantageous if the complexity of these configurations and methods could be reduced to a minimum, concomitant with effective operation, so as to attain maximum ease and economy of manufacture without sacrificing the operating effectiveness of the units.

It is therefore an important object of the invention to provide an assembled fastener unit having a threaded fastener with a lock washer permanently secured thereto wherein means are provided for simplified assembly of the component parts of the unit with maximum operating effectiveness of the assembled unit.

Another object of the invention is to provide a method for assembling a fastener unit having a lock washer permanently secured to a threaded fastener wherein the number and complexity of assembly operations are reduced to a minimum.

Still another object of the invention is to simplify the configuration of both the threaded fastener and the lock washer in assembled fastener and lock washer units so as to effect economy of manufacture without sacrificing operating effectiveness.

A further object of the invention is to provide an assembled fastener unit of improved performance capable of being economically fabricated in large quantities of uniform quality.

The invention provides an assembled lock washer and threaded fastener unit wherein the lock washer is maintained in assembled relationship with the fastener, the lock washer being positively retained against disassembly from the fastener and readily rotatable relative thereto. The unit includes a fastener member having a body with a screw-threaded portion and a clamping surface, and a lock washer having a first frusto-conical body portion with locking means projecting radially therefrom, the first frusto-conical body portion having a first apical angle, a second frusto-conical body portion contiguous with the first body portion and having a second apical angle, and a third body portion contiguous with the second body portion and including radially projecting flange means. A permanently deformed continuous annular lip lies along the body of the fastener member and projects radially between the second body portion and the flange means to retain the lock washer in assembled relationship with the fastener member.

The invention further contemplates the method of assembling a lock washer and a threaded fastener into a unit as described above, the fastener being provided with a body having a screw-threaded portion and a clamping surface and the lock washer being provided with a first body portion with locking means projecting radially therefrom, a second body portion contiguous with the first body portion and having a frusto-conical configuration with an apical angle, and a third body portion contiguous with the second body portion and including radially projecting flange means, the method including the step of pressing the second body portion axially against the clamping surface of the fastener body until a portion of the body of the fastener is permanently deformed radially into a continuous annular lip projecting between the second body portion and the flange means to retain the lock washer in such assembled relationship with the fastener.

The invention will be more fully understood and additional objects and advantages thereof will become apparent in the following detailed description of an embodiment of the invention illustrated in the accompanying drawings in which.

Figure 1:
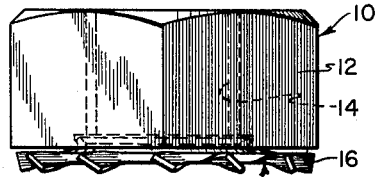
FIGURE 1 is an elevational view of an assembled nut and toothed lock washer unit constructed in accordance with the invention.
Figure 2:
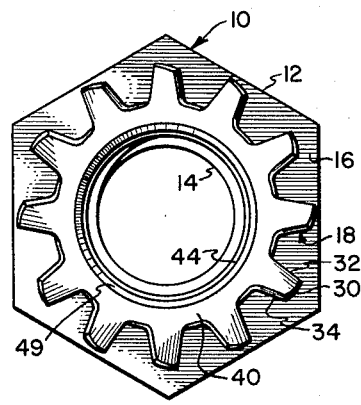
FIGURE 2 is a bottom plan view of the unit of FIGURE 1.

Referring now to the drawings, and especially to FIGURES 1 and 2, an assembled threaded fastener and lock washer unit is illustrated at 10 and includes a nut 12 with an axial screw-threaded aperture 14 and a radial clamping surface 16 and a toothed lock washer 18 permanently secured to the nut 12 adjacent the clamping surface 16.

Figure 3:
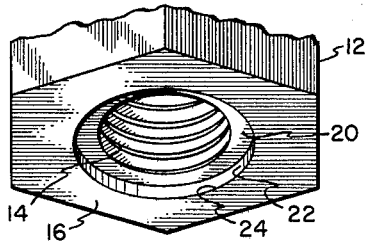
FIGURE 3 is a fragmentary perspective view illustrating the nut prior to assembly with the lock washer.

As best seen in FIGURE 3, the nut 12 is provided with an annular recess 20 lying between the clamping surface 16 and the aperture 14 in the body of the nut. The recess 20 is bounded by a radially outermost peripheral margin 22 which is generally cylindrical and concentric with aperture 14 and intersects the clamping surface 16 at a relatively sharp corner or edge 24.

Figure 4:
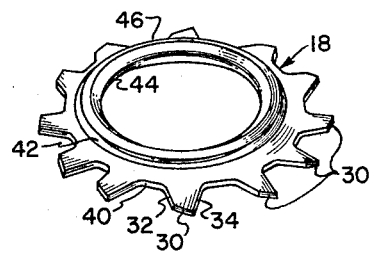
FIGURE 4 is a perspective view illustrating the lock washer prior to assembly with the nut.

The lock washer 18 is illustrated in FIGURE 4 and is shown having a body provided with a plurality of locking teeth 30 which are twisted relative to the remainder of the body to establish upper locking edges 32 and lower locking edge 34 (see also FIGURES 5 through 8) axially displaced from a first, radially outer portion 40 of the body from which portion the teeth project. The radially outer body portion 40 is contiguous with a second, intermediate body portion 42 which, in turn, is contiguous with a third, radially inner portion 44 of the body. A retaining flange 46 is integral with the inner body portion 44 and projects radially outwardly over the intermediate body portion for purposes which will be explained shortly.

Figure 5:
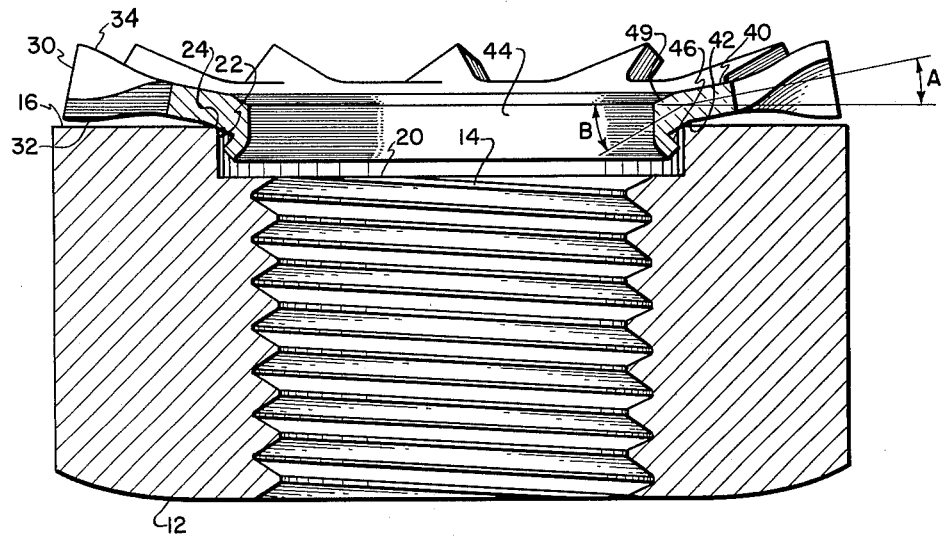
FIGURE 5 is an enlarged cross-sectional view showing the lock washer telescopically associated with the nut, but not yet permanently secured thereto.
Figure 6:
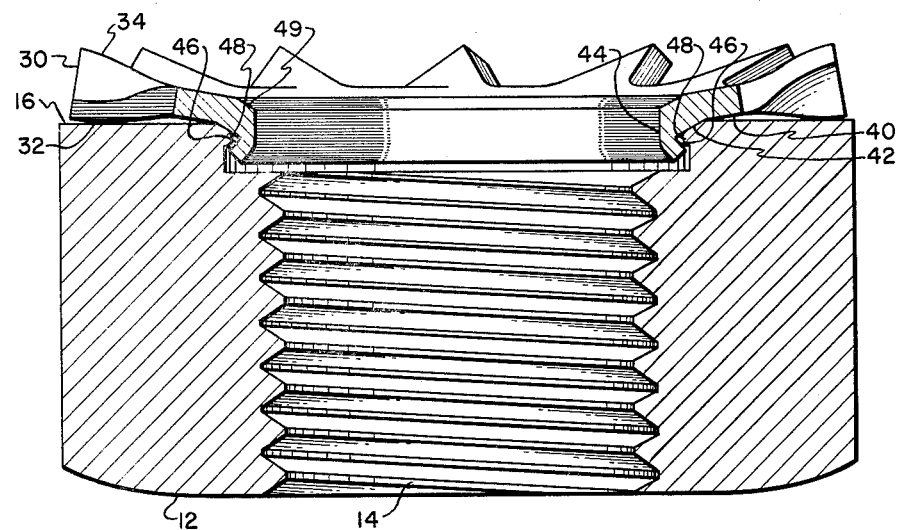
FIGURE 6 is an enlarged cross-sectional view similar to FIGURE 5 with the lock washer now permanently secured in the assembly.

Turning now to FIGURES 5 and 6, both the method of assembling the lock washer 18 and the nut 12, and the configuration of the final assembled unit 10 are clearly illustrated. Looking first at FIGURE 5, the lock washer 18 is seen telescopically associated with the nut 12 with the intermediate body portion 42 lying against edge 24 of the recess 20. Initially, the component parts of the assembly are brought together in such association with the flange 46 of the washer serving to locate the washer concentric with the recess 20, and hence concentric with the aperture 14, and serving to locate the intermediate body portion 42 as shown. The lock washer 18 is then pressed downwardly against edge 24 until the force exerted by the intermediate body portion 42 against edge 24 is great enough to permanently deform the material of the body of the nut 12 at edge 24 and establish an annular lip 48, as seen in FIGURE 6, projecting radially inwardly between the intermediate body portion 42 and retaining flange 46. The lip 48 serves to permanently secure the lock washer 18 in assembled relationship with the nut, and the assembly is complete with no further operation required.

Because it is important that the lock washer 18 not only be secured against disassembly from the nut 12 but also be rotatable relative to the nut 12, precautions are taken to assure that the upper edges 32 of the twisted teeth 30, which edges are adjacent the clamping surface 16, will not grip the clamping surface 16 and lock the washer against rotation despite the movement of the lock washer 18 into the nut during assembly of these component parts. It is also advantageous to bring the lock washer body, and especially the outer body portion 40, as close to the clamping surface 16 as practicable so that the clamping surface can provide support to the washer body when the fastener unit 10 is threaded onto a complementary mating stud and clamped against a workpiece. These ends are accomplished by providing the outer body portion 40 with a frusto-conical configuration having a first apical angle chosen to compensate for the twist of teeth 30 to bring the outer body portion 40 into close proximity with the clamping surface 16 without interference from upper edges 32 of the teeth. The first apical angle is represented in FIGURE 5 by angle A which is the angle between the medial line of the outer body portion 40 and the horizontal (a radial line).

In order to accomplish the deformation of the material of the body of the nut 12 at edge 24 and thus establish lip 48 with relative ease and efficiency and to assure that sufficient material is deformed and that the deformed material will flow in the desired direction, the intermediate body portion 42 is also provided with a frusto-conical configuration having a second apical angle chosen to so facilitate the desired deformation. The second apical angle is represented in FIGURE 5 by angle B which is the angle between the medial line of intermediate body portion 42 and the horizontal (a radial line). It is noted that the frusto-conical configuration of intermediate body portion 42 will also provide a pilot surface 49 to guide a complementary mating fastener element, such as a threaded stud, into the threaded aperture 14 of the completed unit.

Figure 7:
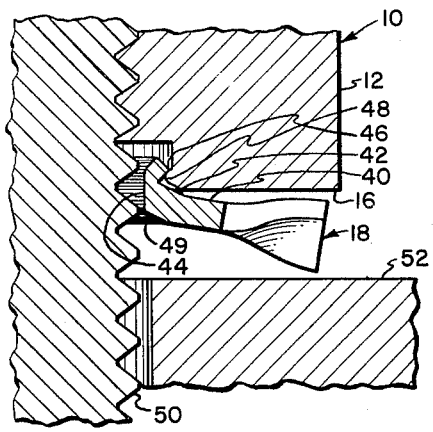
FIGURE 7 is an enlarged fragmentary cross-sectional view showing the threaded fastener unit being threaded onto a mating threaded stud to be secured against a workpiece.
Figure 8:
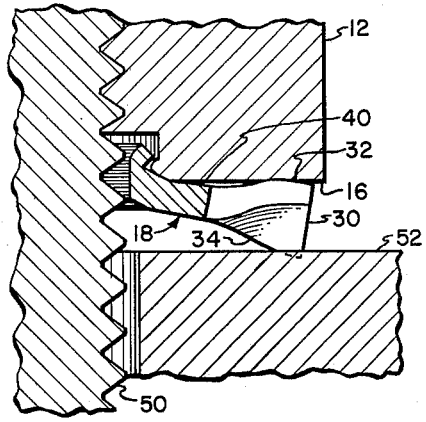
FIGURE 8 is an enlarged fragmentary cross-sectional view similar to FIGURE 7 but with the threaded fastener unit having been advanced along the stud to engage the workpiece.

FIGURES 7 and 8 graphically illustrate the operation of a completed assembled fastener unit and show how the provision of the frusto-conical configuration in the outer body portion 40 serves to allow rotation of the lock washer relative to the nut 12 as the nut is threaded onto a complementary threaded stud 50 prior to clamping of the lock washer 18 between the clamping surface 16 and a workpiece 52 (FIGURE 7) and then serves to allow support of the outer body portion 40 by the clamping surface 16 during clamping of the lock washer 18 against the workpiece 52 (FIGURE 8). In FIGURE 7, the lock washer 18 is seen to be captivated in the assembled unit 10 by virtue of the lip 48 projecting between flange 46 and intermediate body portion 42. While the lock washer 18 cannot be separated axially from the nut 12, relative rotation is accomplished with ease. When the assembled fastener unit 10 is tightened against the workpiece 52, as seen in FIGURE 8, the projecting twisted teeth 30 will engage the clamping surface 16 and the workpiece 52 at upper edges 32 and lower edges 34, respectively, and the lock washer 18 will perform a locking function by virtue of the forces established in advancing the fastener unit along the stud 50 into clamping engagement with the workpiece 52 against the reaction force of the twisted teeth 30. The reaction force is actually reinforced by the support provided along the outer body portion 40 of the lock washer 18 through the close proximity of clamping surface 16.

While the first and second apical angles may be varied in magnitude in accordance with the relative dimensions of the lock washer 18 and the nut 12, and to make allowances for the particular materials employed in the fabrication of both the nut and the lock washer and especially the deformation characteristics of such materials, the employment of the frusto-conical configurations also serves to minimize the structural complexity of the component parts and thus make economical fabrication possible. Thus, the lock washer 18 may be fabricated with only a minimal departure from any one of a number of known fabrication techniques. The provision of flange 46 is a relatively simple operation and can be closely controlled to assure accuracy in the finished component. It is noted that the inner body portion 44, including flange 46, is made thinner than the remaining body portions 40 and 42 and teeth 30. Such thinning out of the material at this portion not only facilitates the working of the material into the desired configuration, but allows the diameter of recess 20 to be reduced to a minimum so that the maximum area is retained in clamping surface 16, despite the establishment of recess 20 in the body of nut 12.

Although the apical angles may be varied as aforesaid, I have found that in common, standard sized threaded fastener units these angles will remain within a relatively small range over a wide variety of dimensions and materials commonly employed in such standard size assembled fastener units of the type illustrated. For example, in fastener units of generally standard sizes, angle A may have a magnitude of from 10° to 15° and angle B may vary from 10° to 30°.

The fabrication of the simplified configuration of the nut 12 requires very little departure from the well known operations in the manufacture of nuts. Thus, the only additional structure over the generally standard nut is the recess 20 which is easily established.

It will be apparent that both the nut 12 and the lock washer 18 can be completely manufactured in final form prior to their assembly with one another to form the completed fastener unit 10. Thus, the tooling required for the fabrication of the nut 12 is independent of the tooling required for the fabrication of the washer 18 and the tooling for assembly of the component parts is made very simple and independent of all other tooling. The nuts 12 may be completely finished all the way down to tapping and plating in standard nut making machinery. Likewise, lock washers 18 can be completely finished with their own heat treating and plating requirements prior to assembly with nuts 12. Such added flexibility in operations reduces manufacturing costs and adds to the desirability of fastener nuts constructed in accordance with the invention.

It is to be understood that the above detailed description of an embodiment of the invention is presented by way of example only. Certain details of design and construction may be varied without departing from the true spirit and scope of the invention as set forth in the appended claims.

I claim:

1. An assembled lock washer and threaded fastener unit wherein the lock washer is maintained in assembled relationship with the fastener, the lock washer being positively retained against disassembly from the fastener and readily rotatable relative thereto, said unit comprising:
- a fastener member having a body with a screw-threaded portion and a clamping surface;
- a lock washer having a unitary body with a central opening and an outer periphery and including therebetween a first, generally annular, frusto-conical body portion defining a first apical angle, a second, generally annular, frusto-conical body portion integral with said first body portion and at least partially coextensive with a portion of the clamping surface, said second body portion defining a second apical angle, and a third body portion integral with said second body portion, said third body portion extending generally axially and including radially projecting flange means;
- a continuous annular lip along the body of said fastener member and projecting radially between the second lock washer body portion and the flange means to retain the lock washer in said assembled relationship with the fastener member, the radial extremity of said lip being displaced axially from the clamping surface in the direction extending into the body of the fastener member; and
- locking teeth integral with the first lock washer body portion, projecting radially therefrom and being twisted relative thereto to present locking edges displaced axially from said first body portion;
- the second apical angle being such that the second body portion extends axially beyond the clamping surface of the fastener member in the direction extending into the body thereof to locate the lip between the second body portion and the flange means and bring the first body portion into close proximity with the clamping surface, and the first apical angle compensating for the twist of said locking teeth to locate the locking edges clear of the clamping surface whereby the first body portion is in close proximity to the clamping surface and the lock washer is readily rotatable relative to the fastener member.

2. An assembled lock washer and threaded fastener unit wherein the lock washer is maintained in assembled relationship with the fastener, the lock washer being positively retained against disassembly from the fastener and readily rotatable relative thereto, said unit comprising:
- a fastener member having a body with an axial screw-threaded portion, a radial clamping surface, an annular recess in said body between the clamping surface and the screw-threaded portion, said recess having a radially outermost axially extending peripheral margin, and a continuous annular lip projecting radially inwardly of said margin adjacent the clamping surface to an inner extremity, said inner extremity being displaced axially from the clamping surface in the direction extending into the body of the fastener member;
- a lock washer having a unitary body with a central opening and an outer periphery and including therebetween an outer, generally annular, frusto-conical body portion defining a first apical angle, an intermediate, generally annular, frusto-conical body portion integral with the radially innermost periphery of the outer body portion, and extending radially outwardly beyond the peripheral margin of the recess and radially inwardly beyond the continuous annular lip and into the annular recess, said intermediate body portion having a second apical angle, and an inner body portion integral with the radially innermost periphery of the intermediate body portion, said inner body portion extending generally axially and including a flange projecting radially outwardly toward the peripheral margin of said recess; and locking teeth integral with the entermost periphery of the outer body portion, projection radially therefrom and being twisted relative thereto to present locking edges displaced axially from said outer body portion;
- the second apical angle being such that the intermediate body portion extends axially beyond the clamping surface of the fastener member in the direction extending into the body thereof to locate the lip between the intermediate body portion and the flange to retain the lock washer in said assembled relationship with the fastener member and bring the outer body portion into close proximity with the clamping surface, and the first apical angle compensating for the twist of said locking teeth to locate the locking edges clear of the clamping surface whereby the outer body portion is in close proximity to the clamping surface and the lock washer is readily rotatable relative to the fastener member.

3. An assembled lock washer and fastener unit of claim 2 wherein the fastener member is a nut and the axial screw-threaded portion is an axial screw-threaded aperture in the body of the nut.

4. An assembled lock washer and fastener unit of claim 3 wherein said inner body portion is relatively thin in comparison to the thickness of the outer body portion to increase the available surface area of said radial clamping surface.

5. An assembled lock washer and fastener unit of claim 2 wherein said inner body portion is relatively thin in comparison to the thickness of the outer body portion to increase the available surface area of said radial clamping surface.

References Cited by the Examiner

UNITED STATES PATENTS

| | | | |
|---|---|---|---|
| 2,225,654 | 12/1940 | Olson | 10—86 |
| 2,234,194 | 3/1941 | Poupitch | 10—86 |
| 2,576,906 | 11/1951 | Poupitch | 151—37 |
| 2,619,145 | 11/1952 | Poupitch | 151—37 |
| 3,016,941 | 1/1962 | Coldren | 151—38 |

FOREIGN PATENTS 500,725  3/1954  Canada.

CARL W. TOMLIN, *Primary Examiner.*

EDWARD C. ALLEN, *Examiner.*

R. S. BRITTS, *Assistant Examiner.*